United States Patent
Hyun et al.

(10) Patent No.: US 12,410,738 B2
(45) Date of Patent: Sep. 9, 2025

(54) EXHAUST GAS PURIFICATION APPARATUS AND CONSTRUCTION MACHINERY INCLUDING THE SAME

(71) Applicant: HD Hyundai Infracore Co., Ltd., Incheon (KR)

(72) Inventors: Rin Hyun, Seoul (KR); Dong Young Jin, Seo-gu (KR); Beomjun Kang, Seoul (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 18/512,249

(22) Filed: Nov. 17, 2023

(65) Prior Publication Data
US 2024/0167407 A1    May 23, 2024

(30) Foreign Application Priority Data
Nov. 21, 2022    (KR) .................. 10-2022-0156173

(51) Int. Cl.
*F01N 3/035*        (2006.01)
*E02F 9/08*         (2006.01)
(Continued)

(52) U.S. Cl.
CPC ............ *F01N 3/035* (2013.01); *E02F 9/0858* (2013.01); *F01N 3/021* (2013.01); *F01N 3/2066* (2013.01);
(Continued)

(58) Field of Classification Search
CPC ........ F01N 3/035; F01N 3/021; F01N 3/2066; F01N 13/0097; F01N 3/04; F01N 13/017;
(Continued)

(56) References Cited

U.S. PATENT DOCUMENTS

2010/0223916 A1*  9/2010  Hayashi .................. F01N 13/02
                                                            60/295
2011/0023452 A1*  2/2011  Gisslen ............... F01N 13/0097
                                                            60/272
(Continued)

FOREIGN PATENT DOCUMENTS

CN      106285876 A  *  1/2017  ............. F01N 13/00
EP      3412879 A1      12/2018
(Continued)

OTHER PUBLICATIONS

Machine Translation of CN 106285876 A (Year: 2017).*
Partial European Search Report for related European Application No. 23210660.9; action dated Mar. 19, 2024; (9 pages).

*Primary Examiner* — Brandon D Lee
(74) *Attorney, Agent, or Firm* — K&L Gates LLP

(57) ABSTRACT

Disclosed is an exhaust gas purification apparatus for purifying exhaust gas emitted from an engine and discharges the exhaust gas to an outside, the apparatus including: a body formed with an opening area in which one area is opened; an intake part disposed on one side of the body through which the exhaust gas is introduced; a filter disposed inside the body and capable of entry and exit through the opening area; a body cover capable of covering the opening area; a selective reduction catalyst disposed with the body to reduce nitrogen oxides contained in exhaust gas passing through the filter; and a discharge part through which exhaust gas having passed through the selective reduction catalyst is discharged.

16 Claims, 17 Drawing Sheets

150:151,152

(51) Int. Cl.
*F01N 3/021* (2006.01)
*F01N 3/04* (2006.01)
*F01N 3/20* (2006.01)
*F01N 13/00* (2010.01)
*F01N 13/18* (2010.01)

(52) U.S. Cl.
CPC ........ *F01N 13/0097* (2014.06); *E02F 9/0891* (2013.01); *F01N 3/04* (2013.01); *F01N 13/017* (2014.06); *F01N 13/1888* (2013.01); *F01N 2330/38* (2013.01); *F01N 2560/00* (2013.01); *F01N 2570/14* (2013.01); *F01N 2590/08* (2013.01); *F01N 2610/02* (2013.01); *F01N 2610/11* (2013.01); *F01N 2610/1406* (2013.01); *F01N 2610/1453* (2013.01)

(58) Field of Classification Search
CPC ............ F01N 13/1888; F01N 2330/38; F01N 2560/00; F01N 2570/14; F01N 2590/08; F01N 2610/02; F01N 2610/11; F01N 2610/1406; F01N 2610/1453; F01N 3/0237; F01N 3/0222; F01N 13/18; F01N 3/208; F01N 9/00; F01N 2560/08; E02F 9/0858; E02F 9/0891; E02F 9/0866; Y02T 10/12; B60Y 2200/41
See application file for complete search history.

(56) References Cited

U.S. PATENT DOCUMENTS

| | | | |
|---|---|---|---|
| 2012/0260635 A1* | 10/2012 | Aneja | F01N 3/033 60/297 |
| 2014/0174696 A1* | 6/2014 | Fahrenkrug | F01N 13/009 165/104.11 |
| 2017/0122156 A1* | 5/2017 | Meister | F01N 3/103 |
| 2020/0271046 A1* | 8/2020 | Kelly | F02B 37/10 |
| 2022/0099009 A1* | 3/2022 | Maganti | F01N 3/0821 |
| 2022/0401944 A1* | 12/2022 | Iojoiu | F01N 3/2828 |

FOREIGN PATENT DOCUMENTS

| | | |
|---|---|---|
| WO | 2008030639 A2 | 3/2008 |
| WO | 2014196346 A1 | 12/2014 |

* cited by examiner

EXHAUST GAS PURIFICATION APPARATUS AND CONSTRUCTION MACHINERY INCLUDING THE SAME

CROSS-REFERENCE TO RELATED APPLICATIONS

This application claims benefit and priority to Korean Patent Application No. 10-2022-0156173, filed on Nov. 21, 2022, with the Korean Intellectual Property Office, the disclosure of which is incorporated herein in its entirety by reference.

TECHNICAL FIELD

The present disclosure relates to an exhaust gas purification apparatus and construction machinery including the same and, more specifically, an exhaust gas purification apparatus with easy access to a filter for convenient replacement by workers, and construction machinery including the same.

BACKGROUND

Existing exhaust gas purification apparatuses have the drawback of limited accessibility to the filters installed within, making it challenging for workers to replace them, thus increasing their fatigue.

One drawback of existing exhaust gas purification apparatuses is the limited accessibility to the filters installed inside them, which makes it challenging for workers to replace them, leading to increased fatigue. This limitation is especially pronounced due to the compact design of these devices, which obstructs easy filter replacement and maintenance.

Furthermore, the exhaust gas purification apparatuses come in different models depending on various installation spaces within construction machinery or equipment. This lack of uniformity results in lower flexibility when arranging the placement of exhaust gas purification apparatuses.

SUMMARY

The present disclosure provides an exhaust gas purification apparatus with easy access to a filter to reduce an operator's fatigue during replacement, and construction machinery including the same. In addition, the present disclosure provides an exhaust gas purification apparatus capable of being installed with flexibility in installation space despite change in arrangement of a single body, and construction machinery including the same.

In one aspect of the present disclosure, there is provided an exhaust gas purification apparatus for purifying exhaust gas emitted from an engine and discharges the exhaust gas to an outside, the apparatus including: a body formed with an opening area in which one area is opened; an intake part disposed on one side of the body through which the exhaust gas is introduced; a filter disposed inside the body and capable of entry and exit through the opening area; a body cover capable of covering the opening area; a selective reduction catalyst disposed with the body to reduce nitrogen oxides contained in exhaust gas passing through the filter; and a discharge part through which exhaust gas having passed through the selective reduction catalyst is discharged.

In addition, the filter may be positioned with a portion of an outer peripheral surface facing an inner peripheral surface of the body cover.

In addition, the intake part and the discharge part may be spaced apart from each other with the filter at a center.

In addition, the intake part may include: an inlet through which exhaust gas is introduced; and a guide area formed on one side of the body with an outwardly protruding portion, and elongated in one direction of the body so that the exhaust gas flowing from the inlet is directed to the filter.

In addition, the exhaust gas purification apparatus may further include an electrical member supported on the body and configured to detect information on exhaust gas passing through the filter or the selective reduction catalyst.

In addition, the exhaust gas purification apparatus may further include a differential pressure detection member supported on the body and configured to detect a differential pressure between exhaust gas flowing into a front of the filter and exhaust gas having passed through the filter.

In addition, the inlet may be disposed relatively closer to the selective reduction catalyst than the filter.

In addition, the exhaust gas purification apparatus may further include an injection part injecting a reducing agent into exhaust gas having passed through the filter; and a mixing member mixing the reducing agent injected from the injection part and the exhaust gas.

In addition, the exhaust gas purification apparatus may further include a coolant tank supported on the body above the injection part and containing coolant to be supplied to the injection part.

In addition, in the opening area, a portion of one surface of the body and a portion of a first neighboring surface adjacent to the one surface may be formed to communicate with each other.

In addition, the filter may be disposed between the one surface and the first neighboring surface.

In addition, the filter may be disposed closer to an upper part of the body than the mixing member.

In addition, the body may have a corner between the first neighboring surface and the other surface opposing the one surface, and a corner of a second neighboring surface between the other surface and the one surface.

In addition, the exhaust gas purification apparatus may further include a bracket installed on one or more of the corners, and the bracket may include: a support arm for contacting and supporting a portion of the installed corners; a fastening portion for securing the body at an installation location; and a bent portion disposed to face a corresponding one of the corners.

In addition, the bent portion may be disposed on an inner side of an imaginary line, which contacts a neighboring surface connected to a corner, where the bracket is installed, in a direction parallel to a height direction of the body.

In addition, the intake part may include an inlet through which exhaust gas is introduced, and the inlet may be positioned away from one end of the filter, through which the exhaust gas flows, in a direction intersecting a longitudinal direction of the filter.

In another aspect of the present disclosure, there is provided construction machinery including: an engine room where the engine is installed; an engine room cover covering the engine room and capable of being opened and closed; and an exhaust gas purification apparatus, wherein the exhaust gas purification apparatus includes: a body formed with an opening area in which one area is opened, an intake part disposed on one side of the body through which the exhaust gas is introduced, a filter disposed inside the body, capable of entry and exit through the opening area, and allowing the exhaust gas to pass therethrough, and a body cover covering the opening area, wherein at least a portion of the body cover is exposed when the engine room cover is opened.

In addition, the exhaust gas purification apparatus may further include a support ring installed on an outer peripheral surface of the body and exposed when the engine room cover is opened.

In yet another aspect of the present disclosure, there is provided construction machinery including: an engine room where the engine is installed; an exhaust gas purification apparatus having at least a portion protruding upward from an engine room, wherein the exhaust gas purification apparatus comprises: a body formed with an opening area in which one area is opened, an intake part disposed on one side of the body through which exhaust gas is introduced, a filter disposed inside the body, capable of entry and exit through the opening area, and allowing the exhaust gas to pass therethrough, and a body cover covering the opening area; and a purification apparatus cover covering at least a portion of the exhaust gas purification apparatus and, when opened, exposing at least a portion of the body cover.

According to embodiments of the present disclosure, in the exhaust gas purification apparatus of the present disclosure, it is easy to enter and exit a filter during replacement. In addition, the exhaust gas purification apparatus of the present disclosure may be installed with flexibility in arrangement despite change of arrangement of a single body.

In addition, according to embodiments of the present disclosure, in the construction machinery of the present disclosure, it is possible for an operator to easily replace the filter installed inside the exhaust gas purification apparatus at least partially inserted into the engine room.

DETAILED DESCRIPTION

Figure 1:
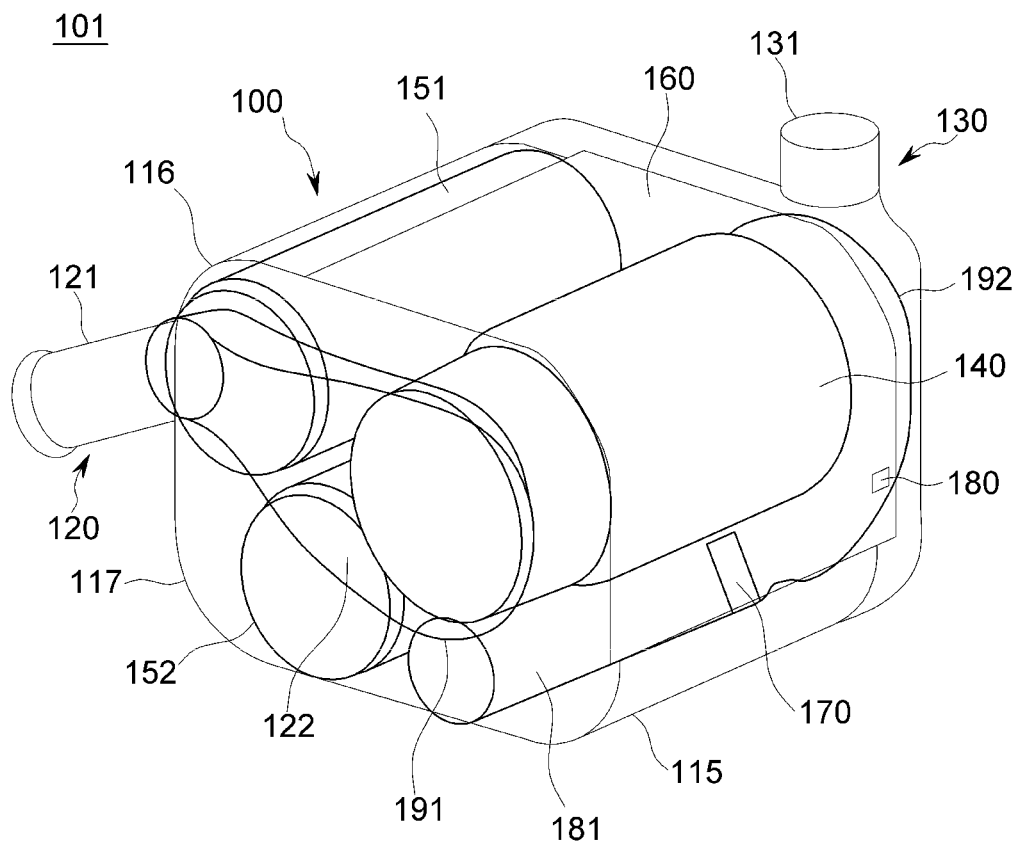
FIG. 1 is a partial projection of the interior of an exhaust gas purification apparatus according to an embodiment of the present disclosure.

Hereinafter, the present disclosure will be described more fully hereinafter with reference to the accompanying drawings, in which exemplary embodiments of the present disclosure are shown. The present disclosure may, however, be embodied in many different forms and should not be construed as limited to the exemplary embodiments set forth herein.

It should be understood that the drawings are schematically illustrated but are not illustrated according to the exact scales. In addition, the relative size and ratio of each configuration shown in the drawings are arbitrarily illustrated for understanding and ease of description, and the thickness of layers, films, panels, regions, etc., are exaggerated or reduced for clarity. The arbitrary size is not restrictive but illustrative only. The same reference numerals or the same reference designators denote the same elements throughout the specification.

The exemplary embodiment of the present disclosure is specifically presented as ideal exemplary embodiments of the present disclosure. As a result, various modifications of the drawings are expected. Therefore, the exemplary embodiment is not limited to specific forms in regions illustrated in the drawings, and for example, includes modifications of forms by the manufacture.

Hereinafter, with reference to FIGS. 1 to 11 and FIG. 16, an exhaust gas purification apparatus 101 according to an embodiment of the present disclosure will be described.

Figure 16:
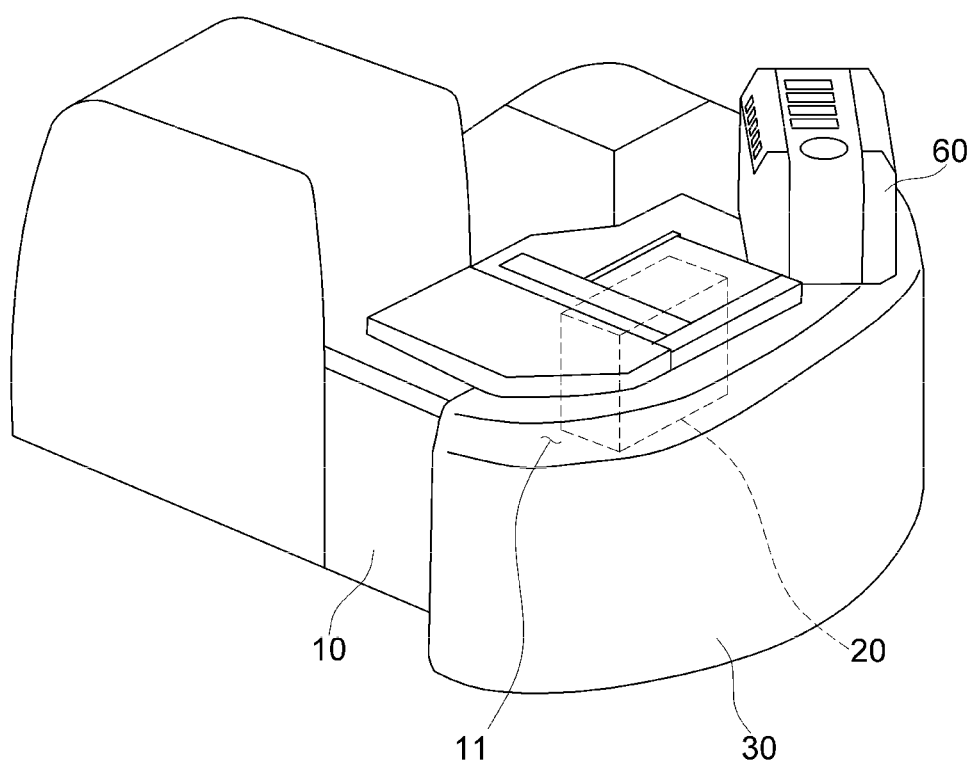
FIG. 16 shows construction machinery equipped with an exhaust gas purification apparatus according to another embodiment of the present disclosure.

As shown in FIG. 16, the exhaust gas purification apparatus 101 purifies the exhaust gas discharged from an engine 20 and discharges the purified exhaust gas to the outside. Specifically, the exhaust gas purification apparatus 101 reduces particulate matters (PM) or nitrogen oxides contained in the exhaust gas expelled through the combustion of the engine 20 and discharges the particulate matters (PM) or nitrogen oxides to the outside.

As shown in FIGS. 1 to 6, the exhaust gas purification apparatus 101 according to an embodiment of the present disclosure includes a body 100, an intake part 120, a filter 140, and a body cover 160. It includes a selective reduction catalyst 150 and a discharge part 130.

The body 100 is formed with an opening area 110 in which one area is open. Specifically, the body 100 forms the exterior of the exhaust gas purification apparatus 101.

The intake part 120 is disposed on one side of the body 100 to guide exhaust gas to flow in. Specifically, the intake part 120 may guide exhaust gas discharged from the engine 20 to flow into the body 100.

The filter 140 is disposed inside the body 100. In addition, the filter 140 is installed to be removable and inserted from and into the body 100 through the opening area 110. Specifically, exhaust gas passes through the filter 140.

As an example, the filter 140 may include one or more of DPF or DOC.

The body cover 160 may cover the opening area 110. Specifically, the body cover 160 may be detachably coupled to the body 100 to enable entry and exit of the filter 140 disposed within the body 100.

The selective reduction catalyst 150 is disposed inside the body 100. In addition, the selective reduction catalyst 150 reduces nitrogen oxides contained in the exhaust gas having passed through the filter 140. Specifically, the selective reduction catalyst 150 may selectively reduce nitrogen oxides contained in the exhaust gas before the exhaust gas is discharged to the outside.

The discharge part 130 guides the exhaust gas, having passed through the selective reduction catalyst 150, to be discharged to the outside of the body 100. Specifically, the exhaust gas discharged to the discharge part 130 may have passed through the filter 140 and the selective reduction catalyst 150.

Due to this configuration, in the exhaust gas purification apparatus 101 according to an embodiment of the present disclosure, the filter 140 may be easily replaced by opening the body cover 160 from the body 100. Specifically, in need of replacement of the filter 140, the operator may remove the body cover 160 of the filter 140 disposed inside the body 100 of the exhaust gas purification apparatus 101 to access the filter 140 through the opening area 110.

In addition, as shown in FIG. 1, the filter 140 of the exhaust gas purification apparatus 101 according to an embodiment of the present disclosure may be arranged so that a portion of an outer peripheral surface of the filter 140 faces an inner peripheral surface of the body cover 160.

As the outer peripheral surface of the filter 140 is disposed inside the body 100 to face the inner peripheral surface of the body cover 160, the filter 140 may be easily accessed when the opening area 110 is opened by removing the body cover 160.

Figure 5:
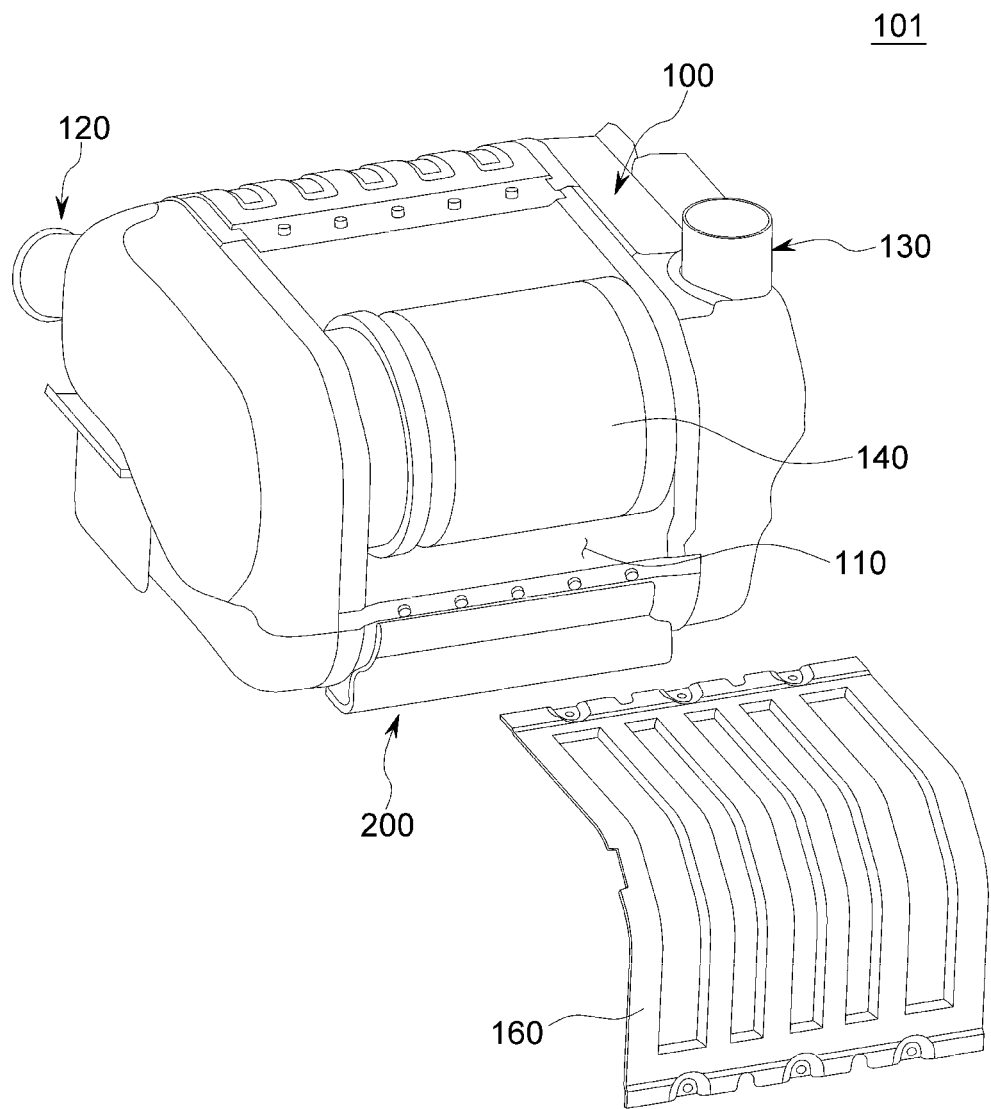
FIG. 5 shows an exhaust gas purification apparatus with an opened body cover according to an embodiment of the present disclosure.
Figure 6:
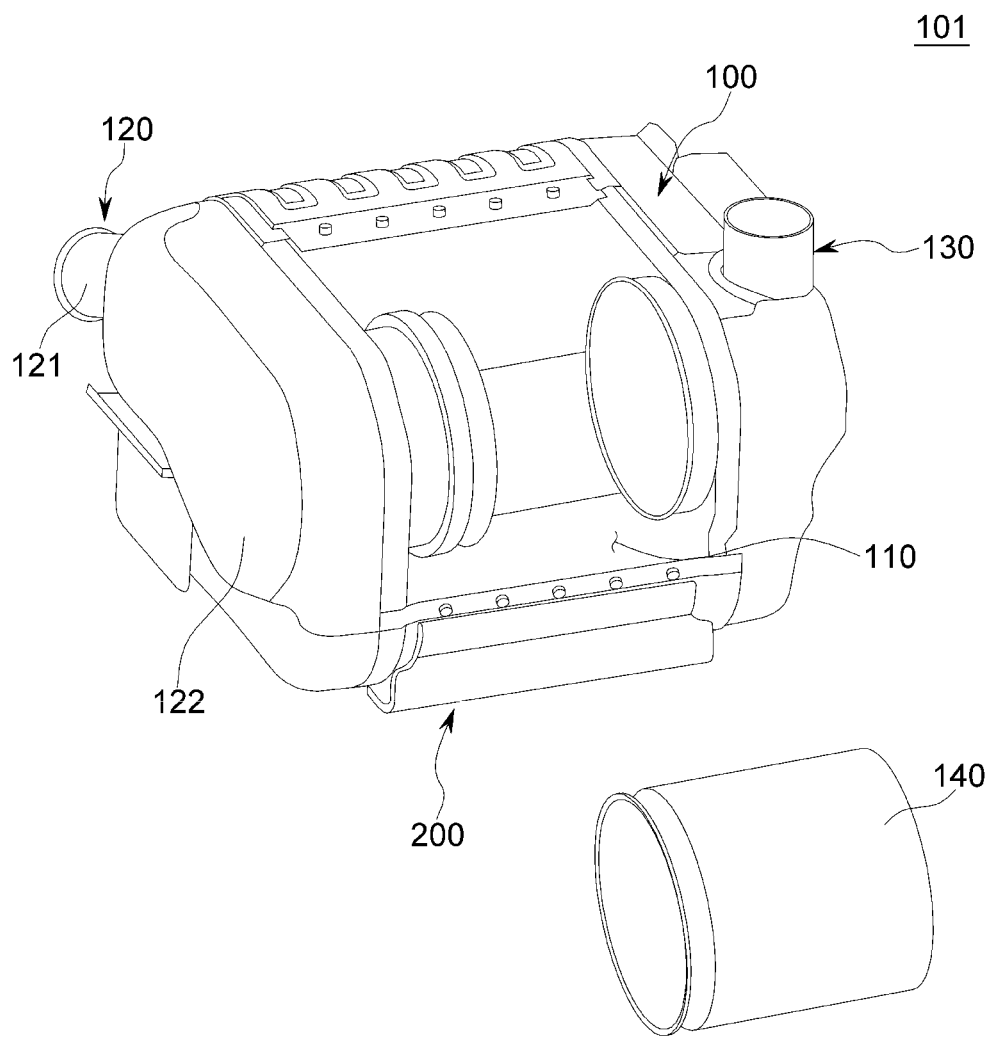
FIG. 6 shows an exhaust gas purification apparatus in which a filter is removed according to an embodiment of the present disclosure.

Specifically, when it's time to replace the filter 140, the operator may easily open the opening area 110, as shown in FIGS. 5 and 6, to remove the filter 140 from the body 100, the filter 140 which is positioned with a portion of its outer peripheral surface facing the inner peripheral surface of the cover 160.

In addition, in the exhaust gas purification apparatus 101 according to an embodiment of the present disclosure, the intake part 120 and the discharge part 130 may be spaced apart from each other with the filter 140 at the center.

The intake part 120 and the discharge part 130 may be spaced apart from each other on the body 100 with the filter 140 at the center. Specifically, the intake part 120 and the discharge part 130 may be spaced apart on the body 100 in a longitudinal direction of the filter 140 which is elongated in one direction. That is, the intake part 120 may be disposed adjacent to one side of the filter 140, and the discharge part 130 may be disposed adjacent to the other side of the filter 140.

Accordingly, the intake part 120 may guide the inflow of exhaust gas into the filter 140, and the discharge part 130 may provide a passage through which the exhaust gas flowing in from the intake part 120 effectively passes through the filter 140 and the selective reduction catalyst 150.

In addition, the intake part 120 may ensures a stable flow of the exhaust gas to flow into the filter 140, and the intake part 120 and the discharge part 130 may be spaced apart. Specifically, due to the above-described arrangement of the intake part 120 and the discharge part 130, the exhaust gas flowing into the body 100 of the exhaust gas purification apparatus 101 may pass through the selective reduction catalyst 150 and be discharge to the outside after a sufficient distance to enter the filter 140 is ensured.

Figure 4:
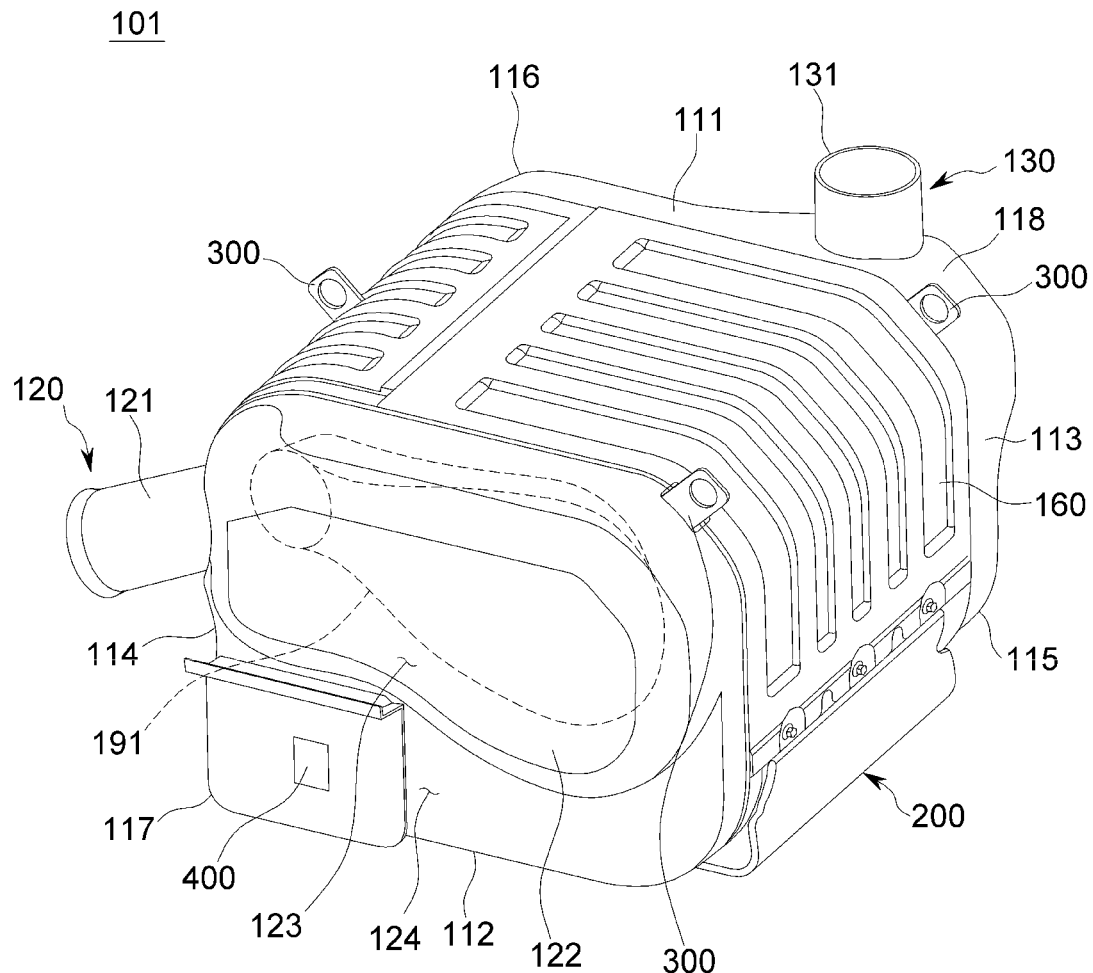
FIG. 4 shows a perspective view of an exhaust gas purification apparatus in one direction according to an embodiment of the present disclosure.

In addition, the intake part 120 according to an embodiment of the present disclosure may include an inlet 121 and a guide area 122, as shown in FIGS. 1 and 4.

The inlet 121 may allow exhaust gas to flow into the body 100. Specifically, the inlet 121 may be formed in the shape of a pipe with a hollow interior and may extend and protrude from the body 100. That is, the inlet 121 may be connected to an exhaust pipe, through which exhaust gas discharged from the engine 20 moves, to guide the inflow of exhaust gas into the body 100.

The guide area 122 may be formed on one side of the body 100 with an outwardly protruding portion. In addition, the guide area 122 may be elongated in one direction of the body 100 to direct the exhaust gas introduced through the inlet 121 into the filter 140. Specifically, one side of the guide area 122 may communicate with the inlet 121, and the other side of the guide area 122 may communicate with the filter 140.

While moving along the guide area 122 through the inlet 121, the exhaust gas may maintain a stable flow and flow into the filter 140. That is, the guide area 122 may be elongated in one direction of the body 100, so that the exhaust gas moving along the guide area 122 can pass through the filter 140 with a stable flow. The guide area 122 may ensure a stable flow of exhaust gas into the filter 140 in the compact space of the body 100, thereby enhancing the degree of freedom in the design of the inlet 121 and the arrangement of the filter 140.

Specifically, the intake part 120 may guide the exhaust gas to flow into the body 100 and ensures a stable flow of the exhaust gas to the filter 140.

Therefore, the inlet 120, with the intake part 121 and guide area 122 disposed on the body 100 in a roughly "cuboid shape", may guide the inflow of exhaust gas not only into the body 100 but also into the filter 140 with a stable flow.

For example, the inlet 121 may be positioned away from the end of the filter 140, where the exhaust gas is introduced, in a direction intersecting with a longitudinal direction of the filter 140, so that the exhaust gas introduced through the inlet 121 can flow into the filter with a sufficient path. Therefore, a stable flow of exhaust gas may flow into the filter 140.

In addition, in the exhaust gas purification apparatus 101 according to an embodiment of the present disclosure, the inlet 121 and the filter 140 may be spaced apart from each other with reference to the selective reduction catalyst 150.

As shown in FIG. 1, the inlet 121 may be placed relatively further away from the filter 140 and the selective reduction catalyst 150. In addition, the inlet 121 may be spaced apart from the filter 140 with reference to the selective reduction catalyst 150.

Therefore, the exhaust gas introduced through the inlet 121 may move along the guide area 122 until reaching the filter 140, maintaining a stable flow, and then be directed into the filter 140.

In addition, the exhaust gas purification apparatus 101 according to an embodiment of the present disclosure may further include an electrical member 400.

The electrical member 400 may be supported on the body 100. In addition, the electrical member 400 may detect information about exhaust gas passing through the filter 140 or the selective reduction catalyst 150.

That is, the electrical member 400 may be sensors required for the exhaust gas purification apparatus 101. Specifically, the electrical member 400 may include a sensor for detecting the concentration of nitrogen oxides (NOx) in exhaust gas so that the exhaust gas purification apparatus 101 reduces and discharges the exhaust gas, and a temperature sensor capable of detecting the temperature of any one or more of the interior of the exhaust gas purification apparatus 101, the filter 140, and the selective reduction catalyst.

In addition, this electrical member 400 may be installed in an electrical member support area 124. Specifically, the guide area 122 partially protruding outward, and a full-length support area 124 relatively recessed than the guide area 122 may be formed on one side of the body 100. At least a portion of the electrical member 400 may be installed in the electrical member support area 124.

That is, an area, where the guide area 122 is formed, and the electrical member support area 124, where the electrical members 400 are installed, are formed in one side of the body 100. Accordingly, the electrical member 400 may be compactly installed in the electrical member support area 124 on one side of the body 100 without the need for a separate installation space.

Therefore, the exhaust gas purification apparatus 101 according to an embodiment of the present disclosure provides an installation area for the electrical member 400, and since the electrical member is installed on the side of the exhaust gas purification apparatus 101, the exhaust gas purification apparatus 101 provides an installation location that allows easy access for maintenance by a worker without interference during replacement of the filter 140.

In addition, the exhaust gas purification apparatus 101 according to an embodiment of the present disclosure may further include a differential pressure detection member 410.

The differential pressure detection member 410 may detect the differential pressure of exhaust gas passing through the filter 140, as shown in FIGS. 1 to 4. Specifically, the differential pressure detection member 410 can detect the difference between the pressure of the exhaust gas supplied to the front of the filter 140 and the pressure of the exhaust gas behind the filter 140 that has passed through the filter 140. The information detected by the differential pressure detection member 410 may be used as information for the replacement cycle or maintenance of the filter 140.

The differential pressure detection member 410 may be supported on the body 100. Specifically, the differential pressure detection member 410 may be installed on the body 100 so as not to interfere when the body cover 160 is opened.

Specifically, the differential pressure detection member 400 may be installed on the other side of the body 100, and may be connected by an electrical line to detect a differential pressure between exhaust gas pressure flowing into the front of the filter 140 and exhaust gas having passed through the filter 140.

Therefore, installing the differential pressure detection member 410 on the other side of the body 100 may reduce the difficulty caused by the disconnection of the electrical member lines connected to the filter 140 when the filter 140 is drawn through the opening area 110. Specifically, if a differential pressure detection member for directly detecting a differential pressure is installed on the front filter 140 or the rear filter 140, it is possible to effectively replace the filter 140 without the need for disassembly or additional work during replacement of the filter 140.

That is, the exhaust gas purification apparatus 101 may provide an installation space for the differential pressure detection member 410 on the other side of the body 100, so when an operator replaces the filter 140, it is possible to effectively reduce the inconvenience for an operator who need to disassemble the differential pressure detection member 410 from the filter 140 during replacement of the filter 140. In addition, the exhaust gas purification apparatus 101 may also provide an installation space where the differential pressure detection member 410 can be installed compactly.

In addition, the specific arrangement of the differential pressure detection member 410 may prevent interference between the differential pressure detection member 410 and the body cover 160, allowing the body cover 160 to be effectively removed from the body 100.

For example, the differential pressure detection member 410, and the NOx sensor and the temperature sensor of the electrical member 400 installed in the electrical member support area 124 may be spaced apart from each other on the body 100.

In addition, the electrical member 400 having electrical components necessary for spraying a reducing agent may be installed on the other side of the body 100.

In addition, the inlet 121 according to an embodiment of the present disclosure may be disposed relatively closer to the selective reduction catalyst 150 than the filter 140, as shown in FIG. 1.

The selective reduction catalyst 150 may be disposed in a direction parallel to the longitudinal direction of the filter 140 and spaced apart from the filter 140.

The inlet 121 may be disposed relatively farther from the filter 140 than the selective reduction catalyst 150, so that the exhaust gas introduced through the inlet 121 moves through the guide area 122 while maintaining a stable flow and be effectively directed into the filter 140. In addition, the exhaust gas having passed through the filter 140 may be effectively supplied to the selective reduction catalyst 150 installed in the body 100.

Accordingly, the selective reduction catalyst 150 and the filter 140 may be compactly installed in the body 100 according to the flow of exhaust gas.

Figure 10:
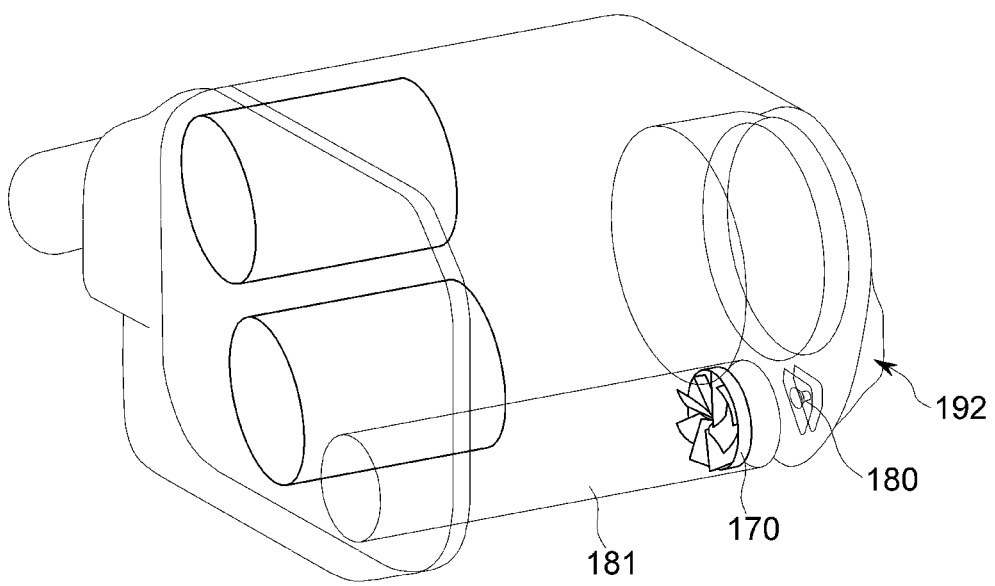
FIG. 10 shows a projected partial configuration of an exhaust gas purification apparatus according to an embodiment of the present disclosure.

In addition, the exhaust gas purification apparatus 101 according to an embodiment of the present disclosure may further include an injection part 180 and a mixing member 170, as shown in FIGS. 1 and 10.

The injection part 180 may inject a reducing agent into the exhaust gas having passed through the filter 140. Specifically, the exhaust gas may be mixed with the reducing agent and flow into the selective reduction catalyst 150. The exhaust gas mixed with the reducing agent and then introduced into the selective reduction catalyst 150 may pass through the selective reduction catalyst 150, reducing the nitrogen oxides contained in the exhaust gas before being discharged.

The injection part 180 may be supported inside the body 100. Specifically, the injection part 180 may be supported on the other side of the body 100.

The mixing member 170 may mix the reducing agent, injected from the injection part 180, with the exhaust gas. Specifically, the mixing member 170 may generate a flow so that the exhaust gas is mixed with the injected reducing agent. For example, the mixing member 170 may be a mixer.

The exhaust gas purification apparatus 101 may be disposed inside the body 100 and may include a guide pipe 181 into which the mixing member 170 is installed.

The guide pipe 181 may be disposed inside the body 100 in a direction parallel to the longitudinal direction of the filter 140. Specifically, the exhaust gas passing through the guide pipe 181 may be effectively mixed with the reducing agent injected from the injection part 180.

For example, the injection part 180 arranged parallel and coaxially to the length of the guide pipe 181, as shown in FIG. 10. In addition, the injection part 180 may inject the reducing agent toward the center of the guide pipe 181.

That is, since the mixing member 170 is installed in the guide pipe 181, it is possible to effectively secure a section where the exhaust gas and the injected reducing agent can be mixed.

Figure 2:
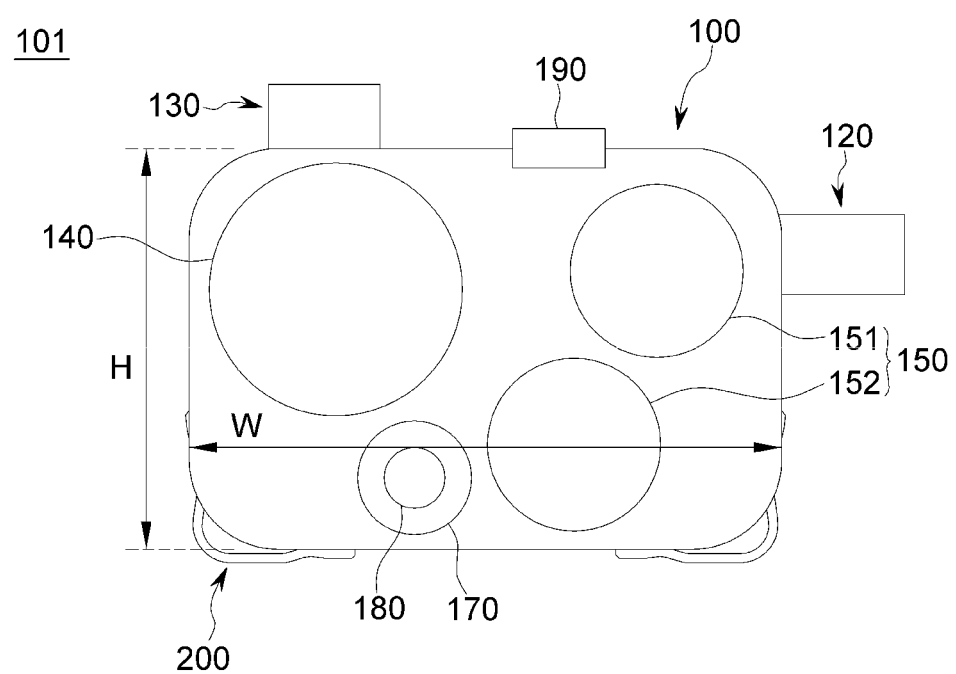
FIG. 2 is a schematic diagram showing the interior of an exhaust gas purification apparatus according to an embodiment of the present disclosure.

In addition, the exhaust gas purification apparatus 101 according to an embodiment of the present disclosure may further include a coolant tank 190, as shown in FIG. 2.

The coolant tank 190 may be supported on the body 100 above the injection part 180. In addition, coolant is stored inside the coolant tank 190. Specifically, the coolant stored in the coolant tank 190 may supply coolant for cooling the injection part 180. That is, the coolant may be supplied in circulation to the injection part 180 to cool the injection part 180.

Specifically, the coolant tank 190 may be supported on the upper part of the body 100 in a higher position than the injection part 180, allowing for a difference in elevation between the coolant tank 190 and the injection part 180.

By supplying coolant from the coolant tank 190 placed to have such a difference in elevation to the injection part 180, the coolant may cool the injection part 180 exposed to the high-temperature exhaust gas, thereby enhancing the lifespan of the injection part 180.

In addition, since the coolant tank 190 of the exhaust gas purification apparatus 101 of the present disclosure is placed higher than the injection part 180 so as to have a difference in elevation to the injection part 180, it is possible to effectively cool the injection part 180 even when the engine is shut off. That is, even in the event of the coolant supplied to the injection part 180 being vaporized due to the high temperature within the injection part 180 when the engine is shut off, the coolant tank 190 may supply low-temperature coolant to the injection nozzle 180 based on the difference in elevation, effectively cooling the injection nozzle 180.

In addition, the opening area 110 of the exhaust gas purification apparatus 101 according to an embodiment of the present disclosure may be formed to communicate with one surface 111 of the body 100 and a portion of a first neighboring surface 113 adjacent to the one surface 111.

The open area 110 may be formed to extend through at least two surfaces of the body 100 to allow entry and exit of the filter 140 for replacement.

The opening area 110 may be formed in communication with a portion of one surface 111 of the body 100 and a portion of the first neighboring surface 113 of the body 100 adjacent to the one surface 111. Specifically, the opening area 110 may be formed to connect one surface 111 of the body 100 and a portion of the first neighboring surface 113 of the body 100 adjacent to the one surface 111.

For example, the opening area 110 may have a cross-section of approximately "L" shape to facilitate entry and exit of the filter 140. That is, the opening area 110 may extend from a part of one side 111 to a part of the first neighboring surface 113, facilitating entry and exit of the filter 140 for replacement.

In addition, the filter 140 according to an embodiment of the present disclosure may be disposed between one surface 111 and the first neighboring surface 113.

The filter 140 may be disposed adjacent to the opening area 110. Specifically, the filter 140 may be disposed between one surface 111 of the body 100, on which the body cover 160 is disposed, and the first neighboring surface 113. The filter 140 may be disposed so that a portion of the outer peripheral surface of the filter 140 may be exposed to a part of the opening area 110 formed on one side 111, while another portion of the outer peripheral surface of the filter 140 is exposed to a part of the opening area 110 formed on the first neighboring surface 113.

Accordingly, the filter 140 is disposed between one side 111 and the first adjacent side 113. Thus, the filter 140 may be able to enter and exit through the opening area 110.

In addition, the filter 140 according to an embodiment of the present disclosure may be disposed closer to the upper part of the body 100 than the mixing member 170.

The filter 140 may be disposed closer to the upper part of the body 100 than the mixing member 170. In addition, the filter 140 may be disposed adjacent to the upper part of the body 100 to facilitate replacement.

Specifically, the mixing member 170 may be disposed lower than the filter 140 within the body 100 so that the exhaust gas having passed through the filter 140 is mixed with the reducing agent. That is, the filter 140 may be disposed closer to the upper part of the body 100 than the injection part 180.

Accordingly, the filter 140 may be easily replaced within the body 100.

In addition, some corners 115, 116, and 117 of the body 100 according to an embodiment of the present disclosure may be formed identically.

A first corner 115 between the first neighboring surface 113 and the other surface 112 of the body 100 opposing the one surface 111, and a second corner 117 between the second neighboring surface 114 opposite to the first neighboring and the other surface 112 may be formed identically. The second neighboring surface 114 may be disposed between the other surface 112 and one surface 111. That is, the second neighboring surface 114 may be disposed adjacent to the other surface 112 and the one surface 111.

For example, the body 100 may have at least three corners 115, 116, and 117 formed identically.

A third corner 116 of the body 100 between the second adjacent surface 114 and one surface 111 may be formed to be the same as the first corner 115 and the second corner 117. That is, the corners 115, 116, and 117 of the body 100 may be formed identically, except for an area between the one surface 111 and the first neighboring surface 113 where the open area 110.

In addition, the first, second, and third corners 115, 116, and 117 may be formed with the same roundness (curved surface). The roundness formed at the first, second, and third corners 115, 116, and 117 may distribute the loads applied to the first, second, and third corners 115, 116, and 117, thereby enhancing the rigidity of the body 100.

Figure 7:
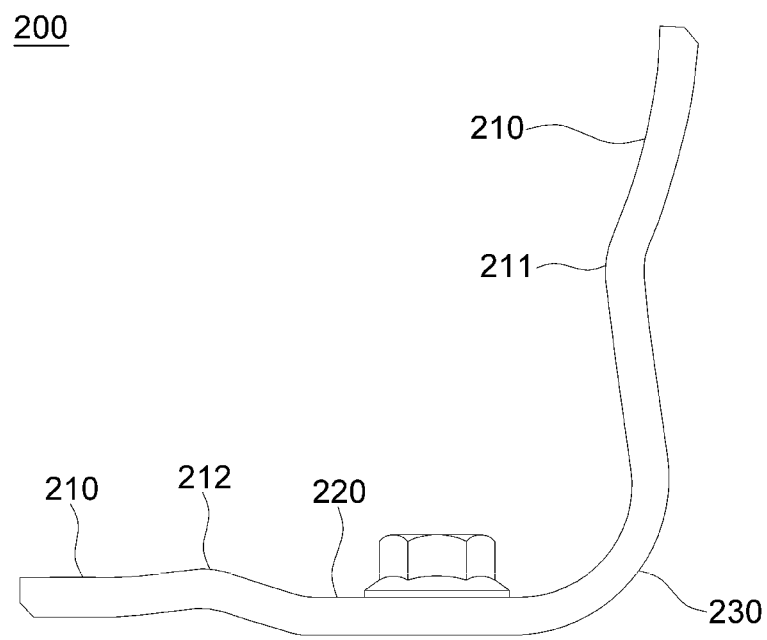
FIG. 7 shows a cross section of a bracket according to an embodiment of the present disclosure.
Figure 8:
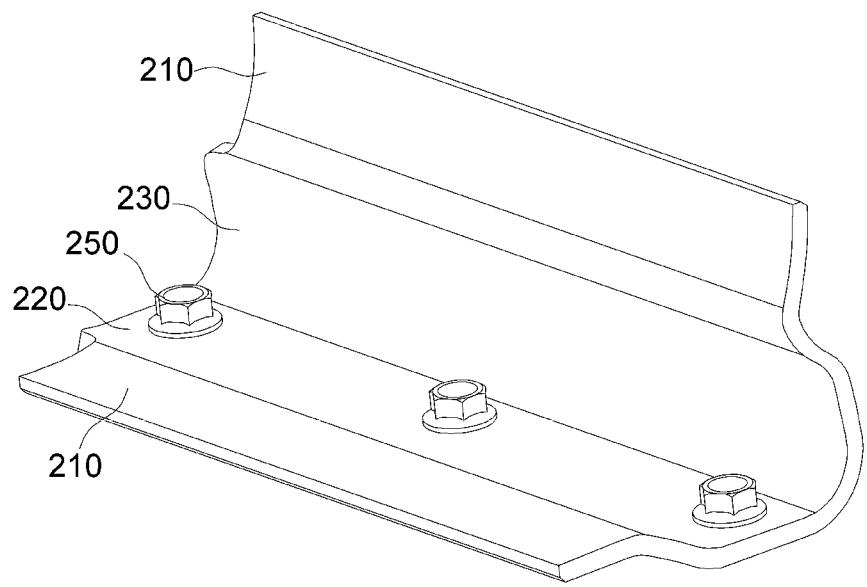
FIG. 8 shows a perspective view of a bracket according to an embodiment of the present disclosure.
Figure 9:
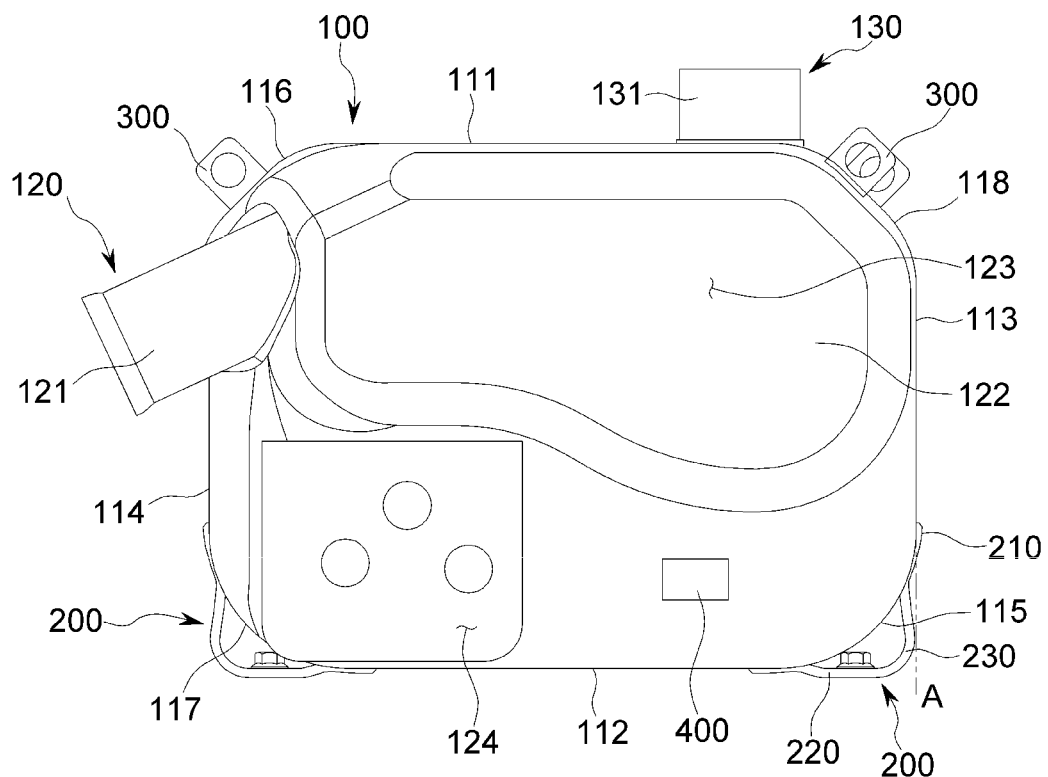
FIG. 9 shows a side view of an exhaust gas purification apparatus according to an embodiment of the present disclosure.

In addition, the exhaust gas purification apparatus 101 according to an embodiment of the present disclosure further includes a bracket 200, as shown in FIGS. 7 to 9.

The bracket 200 includes a support arm 210, a fastening portion 220, and a bent portion 230.

The bracket 200 may be provided to fix the body 100 to an installation location in a machine or facility where the exhaust gas purification apparatus 101 is to be installed.

The bracket 200 may be installed at the lower corners 115, 116, and 117 of the body 100 to fix the exhaust gas purification apparatus 101 at the installation location.

The bracket 200 may be installed at the first corner 115 and the second corner 117, as shown in FIGS. 7 to 9.

The bracket 200 may be elongated in one direction parallel to the longitudinal direction of the filter 140. The support arm 210 may be formed on one side of the bracket 200 to contact and support a portion of the first corner 115 adjacent to the first neighboring surface 113.

For example, the support arm 210 may be formed with a curved surface to contact and support a portion of the first corner 115.

In addition, a support arm 210 may be formed on the other side of the bracket 200 to contact and support a portion of the first corner 115 adjacent to the other surface 112.

The fastening portion 220 may be formed in the bracket 200. The fastening portion 220 may be coupled with a fastening member that secures the bracket 200 at the installation location.

The bent portion 230 may be spaced apart from another portion (central portion) of each of the corners 115, 116, and 117. In addition, the bent portion 230 may be disposed to face another portion of each of the corners 115, 116, and 117. Specifically, the bent portion 230 of the bracket 200 may be positioned between both sides of the bracket 200 and bent in a direction so that the two sides become adjacent.

That is, the bracket 200 may have support arms 210 formed on both sides with the bent portion 230 at the center, and the fastening portion 220 may be positioned in an area facing the floor, which is the installation location of the body 100. In addition, a nut 250 where a fastening member can be inserted and fastened may be installed in the fastening portion 220.

In addition, the bent portion 230 according to an embodiment of the present disclosure may be disposed on the inner side relative to the neighboring surfaces 114 and 113 connected to the corners 115 and 117 where the bracket 200 is installed.

The bent portion 230 may be disposed so as not to protrude outward from a surface of the body 100 adjacent to the corners 115, 116, and 117 where the bracket 200 is installed. Specifically, the bent portion 230 may be disposed so as not to protrude from an outer surface of the body 100, providing a degree of freedom in the installation location where the exhaust gas purification apparatus 101 is installed. That is, when the bracket 200 used to secure the body 100 for the installation of the exhaust gas purification apparatus 101 is of a large size, it is possible to address the issue of considering not only the size of the body 100 but also the size and placement of the bracket 200.

For example, the bracket 200 may be installed at the first corner 115 between the other surface 112 and the first neighboring surface 113, as shown in FIG. 9.

The outer circumference of the bent portion 230 of the bracket 200 may be located on the inner side of an imaginary line A that contacts the first neighboring surface 113 in a direction parallel to a height direction of the body 100. That is, the bent portion 230 of the bracket 200 may be located closer to the inside of the body 100 than the imaginary line A in the height direction of the body 100 that contacts the first neighboring surface 113.

In other words, the bent portion 230 may not protrude outward from the first neighboring surface 113.

Therefore, when the body 100 is fixed at the installation location by fastening the fastening member to the fastening portion 220, a high degree of freedom in the installation location and the installation space for the body 100 may be achieved. Therefore, installation at the installation location is possible without considering interference with other components, which may occur when the bent portion 230 protrudes beyond the imaginary line A, or without having to consider the size of the bracket 200 for the installation of the exhaust gas purification apparatus 101.

Specifically, the bent portion 230 may be spaced apart from the imaginary line A and closer to the center of the body 100 than the imaginary line A.

In addition, the bracket 200 may include a first welding area 121 and a second welding area 122, as shown in FIG. 7.

The body 100 may be welded to the first welding area 121 formed in a support arm 210 on one side of the bracket 200, specifically in an area adjacent to the first neighboring surface 113 of the first corner 115.

In addition, the body 100 may be welded to the second welding area 122 formed on a support arm 210 on the other side of the bracket 200, specifically in an area adjacent to the other surface 112 of the first corner 115.

The first welding area 121 and the second welding area 122 may be formed to protrude toward the center of the rounded surface of the first corner 115.

In addition, the fastening portion 220 may be disposed lower than the support arm 210 formed on the other side of the bracket 200.

In addition, as shown in FIG. 2, in the body 100 of the exhaust gas purification apparatus 101 according to an embodiment of the present disclosure, a width W of the body 100 may be greater than a height H of the body 100.

The width W of the body 100 may be formed in a direction that intersects the longitudinal direction of the filter 140. Specifically, if the direction parallel to the longitudinal direction of the filter 140 is a longitudinal direction of the body 100, the width W of the body 100 may be formed in a direction that intersects the longitudinal direction of the body 100.

The height H of the body 100 may be formed a direction that intersects the longitudinal direction of the body 100 and the width W direction of the body 100. That is, the height H of the body 100 and the width of the body 100 may be perpendicular to each other.

The width W of the body 100 may be greater than the height H of the body 100. Specifically, the body 100 may be formed in an approximately rectangular shape in which a cross-sectional width W in a direction perpendicular to the longitudinal direction is relatively greater than the height H.

In addition, the discharge part 130 of the exhaust gas purification apparatus 101 according to an embodiment of the present disclosure may include an outlet 131, as shown in FIG. 1.

The outlet 131 may be disposed in the body 100 to guide the exhaust gas, having passed through the selective reduction catalyst 150, to be discharged to the outside of the body 100. For example, the outlet 131 may be formed in a pipe shape with a hollow interior, and may be connected to an exhaust pipe that guides exhaust gas to the outside.

The outlet 131 may be disposed relatively higher on the body 100 than the inlet 121.

As shown in FIG. 1, one end of the outlet 131 connected to the body 100 may be disposed relatively closer to an upper surface of the body 100 than one end of the inlet 121 connected to the body 100.

In addition, as shown in FIG. 1, the outlet 131 may be spaced apart from the outlet in the longitudinal direction of the filter 140.

In addition, as shown in FIG. 1, in the exhaust gas purification apparatus 101 according to an embodiment of the present disclosure, the inlet 121 and the filter 140 may be spaced apart from each other with respect to the central axis of a cross-section of the body 100.

On a cross section in a direction perpendicular to the longitudinal direction of the body 100, the inlet 121 may be spaced apart from the filter 140 with respect to the central axis of the cross section of the body 100. Due to the arrangement of the inlet 121 and the filter 140, the exhaust gas introduced through the inlet 121 may move with a uniform flow and pass through the filter 140.

In addition, as shown in FIGS. 1 and 2, a plurality of selective reduction catalysts 150 according to an embodiment of the present disclosure may be installed.

The selective reduction catalyst 150 may include a first catalyst 151 and a second catalyst 152. Specifically, the first catalyst 151 and the second catalyst 152 may be placed side by side with each other in the body 100. The first catalyst 151 and the second catalyst 152 may guide the exhaust gas mixed with a reducing agent so that the exhaust gas is branched and directed to pass through the first catalyst 151 and the second catalyst 152 in parallel.

Accordingly, the exhaust gas may pass through the first catalyst 151 and the second catalyst 152 in parallel flow, so that nitrogen oxides contained in the exhaust gas can be effectively reduced within the compact body 100.

In addition, the first catalyst 151 and the second catalyst 152 may be spaced apart from each other with their respective central axes spaced apart along the height direction of the body 100.

Figure 3:
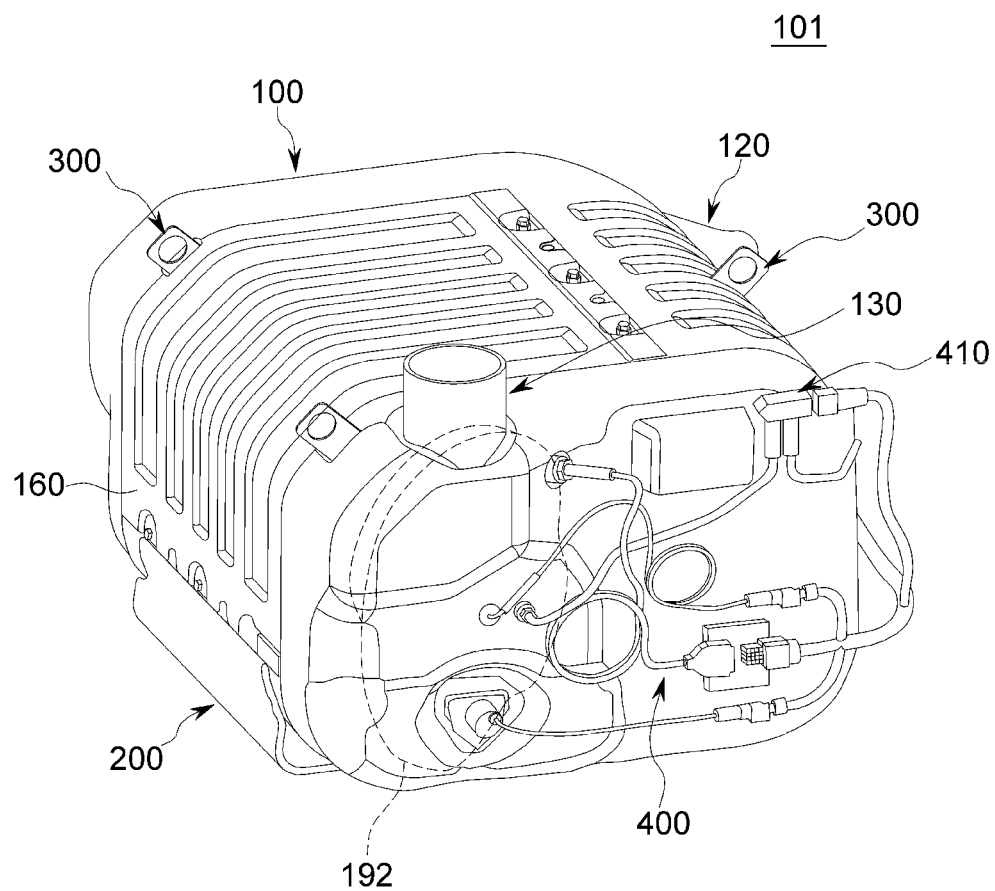
FIG. 3 shows a perspective view of an exhaust gas purification apparatus in the other direction according to an embodiment of the present disclosure.

In addition, the exhaust gas purification apparatus 101 according to an embodiment of the present disclosure may further include a support ring 300, as shown in FIGS. 3 and 4.

The support ring 300 may be installed in the body 100. A hanging rope or chain may be installed to hang on the support ring 300 for the installation, movement, and transportation of the exhaust gas purification apparatus 101.

As shown in FIG. 3, the support ring 300 may be installed in a portion of the body 100 where the body cover 160 is not disposed. Specifically, the support ring 300 may be disposed closer to the upper part of the body 100 than to the lower part.

As shown in FIG. 4, the support ring 300 may be installed in a portion of the body 100 adjacent to the third corner 116 or one side 111.

The support ring 300 may be installed at the fourth corner 118 between one side 111 and the first adjacent side 113.

A plurality of support rings 300 may be installed and spaced apart in the body 100 to enable the exhaust gas purification apparatus 101 to move stably.

Figure 11:
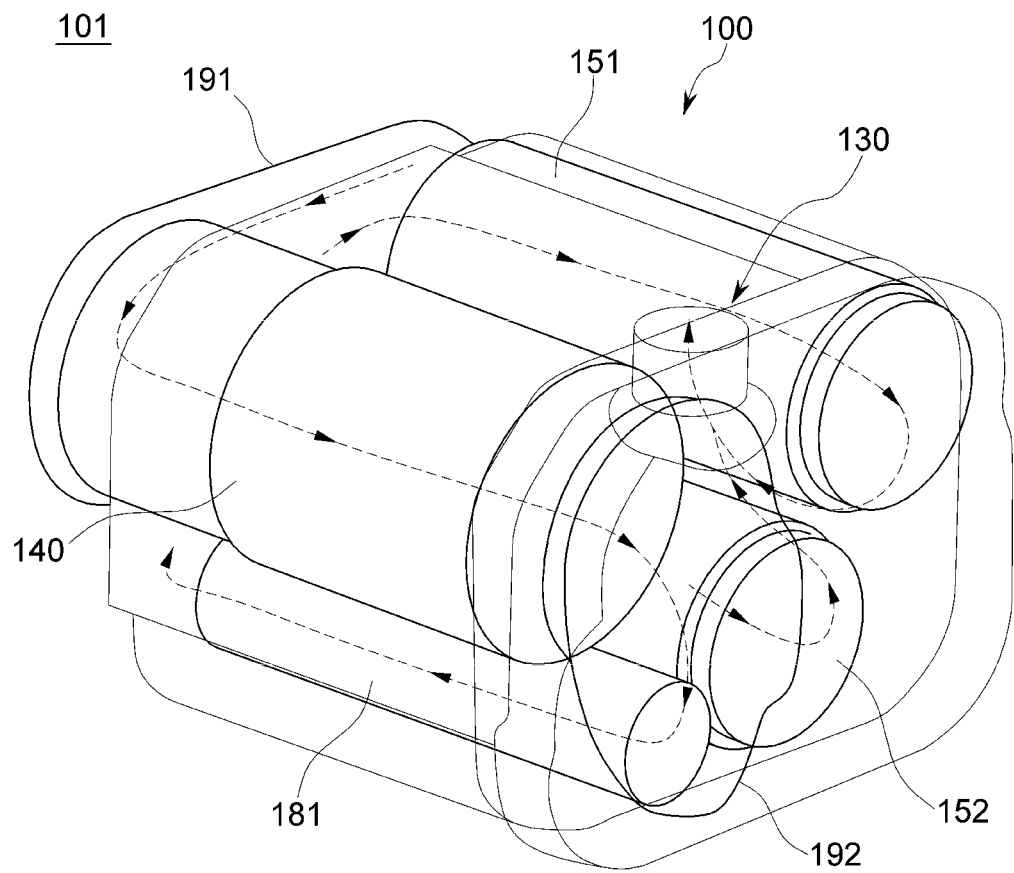
FIG. 11 shows an exhaust gas flow inside an exhaust gas purification apparatus according to an embodiment of the present disclosure.

In addition, the exhaust gas purification apparatus 101 according to an embodiment of the present disclosure may include an inflow duct 191 and a guide duct 192, as shown in FIGS. 1, 10, and 11.

As shown in FIG. 1, the inflow duct 191 may guide the exhaust gas, introduced through the inlet 121, to flow into the filter 140 through the inflow duct 191. Specifically, the inflow duct 191 may be installed inside the guide area 122.

That is, the guide area 122 protruding from the body 100 forms a space in which the inflow duct 191 is to be installed, and the exhaust gas introduced through the inlet 121 flows into the filter 140 through the inflow duct 191.

Specifically, one side of the inflow duct 191 may communicate with the inlet 121 and the other side may communicate with the filter 140.

As shown in FIGS. 10 and 11, the guide duct 192 may guide the exhaust gas, having passed through the filter 140, to flow into the guide pipe 181. The injection part 180 may be supported on the guide duct 192.

Specifically, the guide duct 192 may be disposed inside the body 100 to connect the filter 140 and the guide pipe 181. In addition, the guide duct 192 may be disposed so that one side communicates with the filter 140 and the other side communicates with the guide pipe 181. In addition, the injection part 180 may be supported on the guide duct 192 so that a reducing agent is injected toward the center of the guide pipe 181.

The exhaust gas purification apparatus 101 according to an embodiment of the present disclosure may further include a branch duct, which is not shown.

The branch duct may guide the flow of exhaust gas having passed through the guide pipe 181 to the first catalyst 151 and the second catalyst 152.

Hereinafter, with reference to FIGS. 1 and 11, the flow of exhaust gas within the exhaust gas purification apparatus 101 according to an embodiment of the present disclosure will be described.

Exhaust gas discharged from the engine flows into the body 100 through the inlet 121. The exhaust gas flows along the guide area 122 that is formed long in one direction of the body 100. In this case, the exhaust gas may have a stable flow.

The exhaust gas is directed into the filter 140 with a stable flow. While passing through the filter 140, particulate matters contained in the exhaust gas may be reduced.

The exhaust gas having passed through the filter 140 flows into the guide pipe 181 through an internal guide duct. In this case, the reducing agent is injected into the exhaust gas from the injection part 180. Specifically, the injection part 180 may be positioned coaxially with the central direction of the mixing member 170 and able to inject the reducing agent.

The injected reducing agent passes through the mixing member 170 together with the exhaust gas. Accordingly, while moving along the guide pipe 181, the exhaust gas may be mixed with the reducing agent by the mixing member 170 disposed in the guide pipe 181.

After passing through the mixing member 170, the exhaust gas mixed with the reducing agent moves along the guide pipe 181 and flows into the plurality of catalysts 151 and 152 in parallel. Specifically, the exhaust gas mixed with the reducing agent is branched into the first catalyst 151 and the second catalyst 152.

The exhaust gas, which has passed through the first catalyst 151 and the second catalyst 152, may be purified of nitrogen oxides. Also, the exhaust gas, which has passed through the first catalyst 151 and the second catalyst 152, may be discharged to the outside of the body 100 through the outlet 131.

Hereinafter, an exhaust gas purification apparatus 102 according to another embodiment of the present disclosure will be described with reference to FIGS. 12 to 14.

The internal configuration and shape of the exhaust gas purification apparatus 102 according to another embodiment of the present disclosure may be the same as those of the exhaust gas purification apparatus 101 according to the above-described embodiment of the present disclosure.

Figure 12:
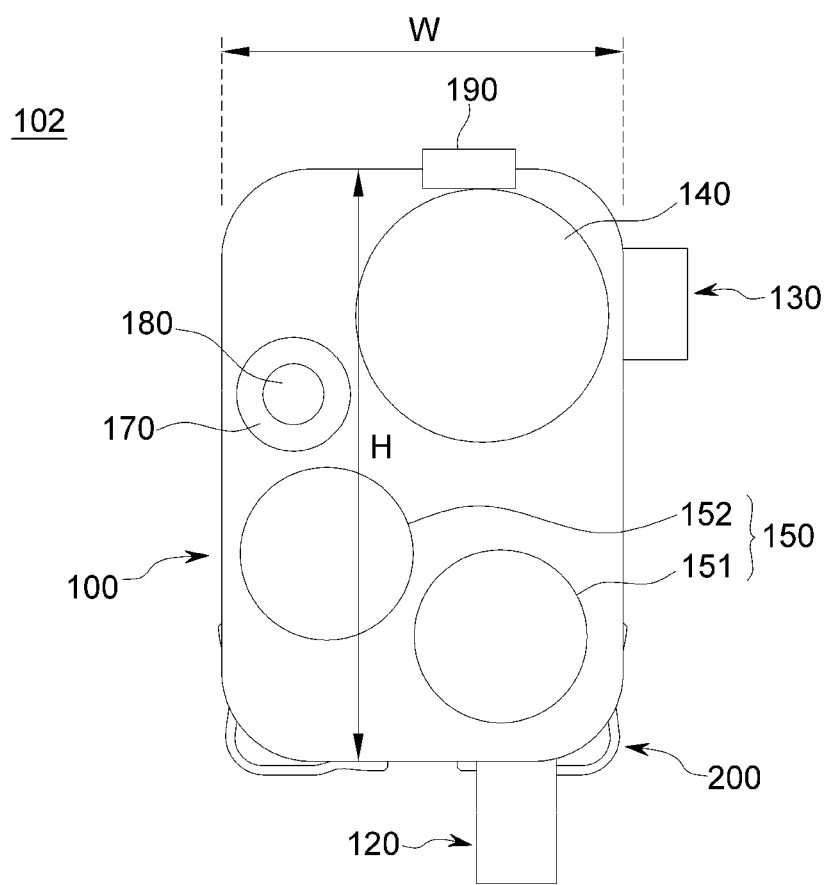
FIG. 12 is a simplified diagram showing the interior of an exhaust gas purification apparatus according to another embodiment of the present disclosure.
Figure 13:
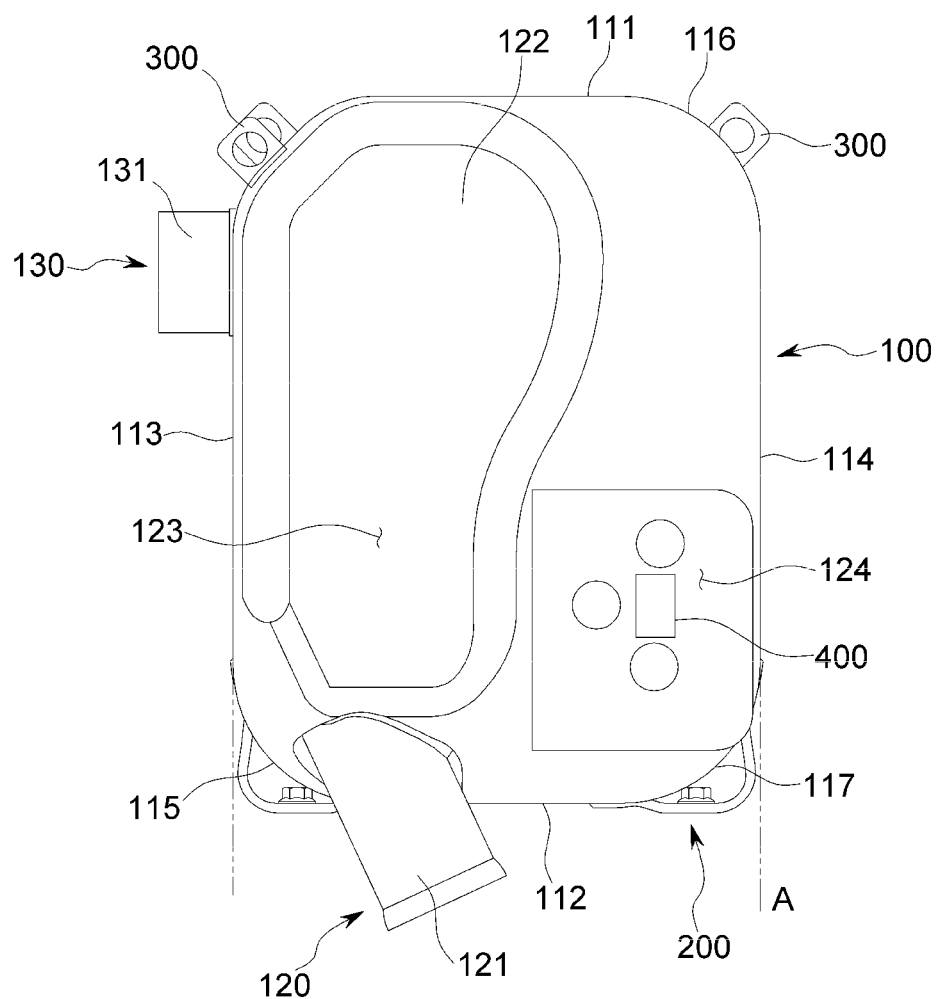
FIG. 13 shows a side view of an exhaust gas purification apparatus according to another embodiment of the present disclosure.
Figure 14:
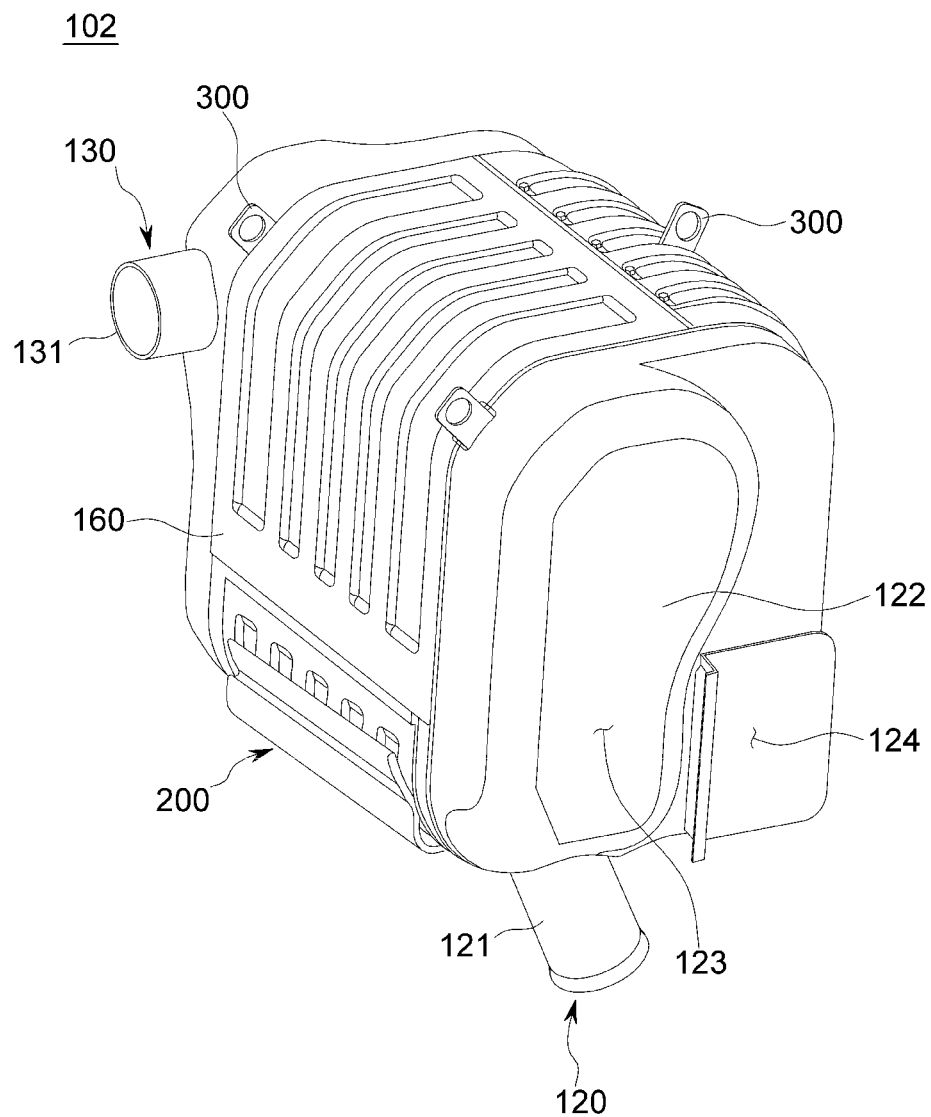
FIG. 14 shows a perspective view of an exhaust gas purification apparatus according to another embodiment of the present disclosure.

As shown in FIGS. 12 to 14, in the exhaust gas purification apparatus 102 according to another embodiment of the present disclosure, the width W of the body 100 parallel to the direction intersecting the longitudinal direction of the filter 140 may be smaller than the height H of the body 100.

The width W of the body 100 may be formed in a direction that intersects the longitudinal direction of the filter 140. Specifically, if the direction parallel to the longitudinal direction of the filter 140 is a longitudinal direction of the body 100, the width W of the body 100 may be formed in a direction that intersects the longitudinal direction of the body 100.

The height H of the body 100 may be formed a direction that intersects the longitudinal direction of the body 100 and the width W direction of the body 100. That is, the height H of the body 100 and the width of the body 100 may be perpendicular to each other.

The width W of the body 100 may be smaller than the height H of the body 100. Specifically, the body 100 may be formed in an approximately rectangular shape in which a cross-sectional width W in a direction perpendicular to the longitudinal direction is relatively smaller than the height H.

For example, in the exhaust gas purification apparatus 102 of the present disclosure, a length of the body cover 160 formed in the first neighboring surface 113 may be relatively greater than that of the exhaust gas purification apparatus 101. In this case, the length of the body cover 160 formed on one side 111 of the exhaust gas purification apparatus 102 of the present disclosure may be relatively smaller than that of the exhaust gas purification apparatus 101.

That is, with the body cover 160 formed on one surface 111 of the single body 100 and the first neighboring surface 113 adjacent to one surface 111, it is still easy to insert and remove the filter 140 even if the body 100 is installed in a different orientation.

The body 100 may be effectively installed by simply changing its orientation, without the need to consider the shape of body 100 depending on the installation location within the construction machinery 103 and 104.

In the exhaust gas purification apparatus 101, 102 according to an embodiment of the present disclosure, the first corner 115, the second corner 117, and the third corner 116 may be formed to have the same roundness, allowing effective installation of the bracket 200 even when the bracket 200 is installed in an installation space by changing the orientation of the body 100.

For example, as shown in FIG. 2, the bracket 200 may effectively support the body 100 even when the body 100 is arranged in an orientation where the width W is relatively greater than the height H.

That is, due to the shapes of the corners 115, 116, and 117 described above, the body 100 may be effectively supported using the bracket 200 of a single design.

Hereinafter, construction machinery 103 according to an embodiment of the present disclosure will be described with reference to FIGS. 1 to 11 and 15.

The construction machinery 103 performs tasks of transporting and excavating soil.

Figure 15:
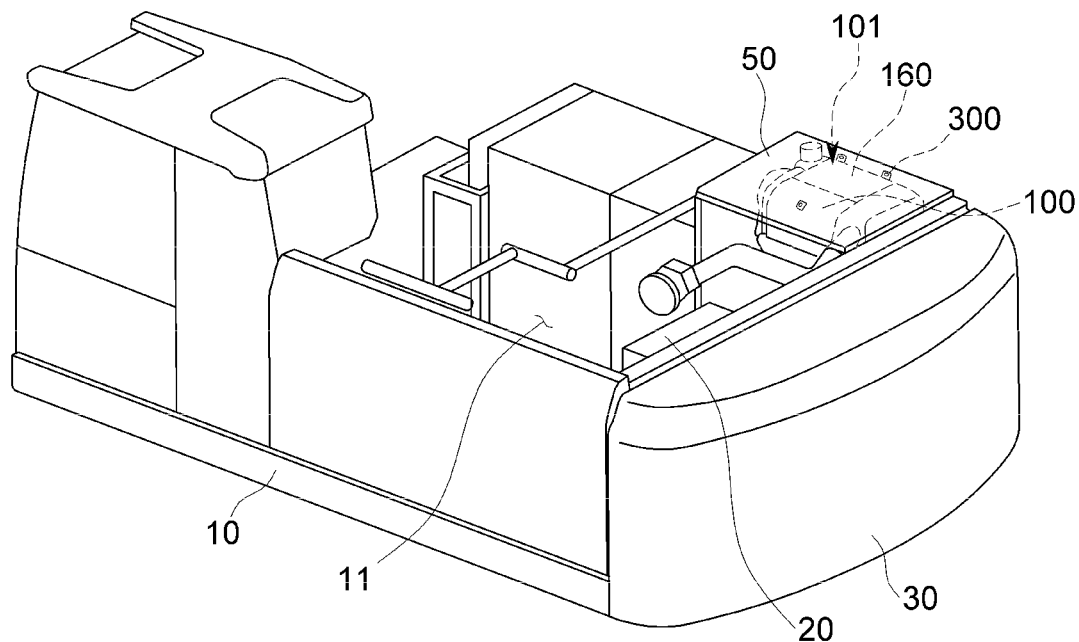
FIG. 15 shows construction machinery equipped with an exhaust gas purification apparatus according to an embodiment of the present disclosure.

As shown in FIG. 15, the construction machinery 103 according to an embodiment of the present disclosure includes an engine room 11, an engine room cover 50, and an exhaust gas purification apparatus 101.

An engine 20 is installed inside the engine room 11. The engine 20 may combust fuel and generate power, which, in turn, can operate the motors or pumps necessary for driving the construction machinery 103. Specifically, the engine room 11 is formed with one side open.

In addition, the engine room 11 may be formed on a main frame 10 and have the engine 20 installed therein. A counterweight 30 of the construction machinery 103 may be placed adjacent to the engine room 11.

The engine room cover 50 covers the engine room 11 so that the engine room can be opened and closed. Specifically, the engine room cover 50 may open and close one open side of the engine room 11.

The exhaust gas purification apparatus 101 is installed in the engine room 11. In addition, the exhaust gas purification apparatus 101 purifies exhaust gas discharged from the engine 20 and discharges the purified exhaust gas to the outside. That is, when the engine room cover 50 is opened, part of the exhaust gas purification apparatus 101 may be exposed to the outside.

The exhaust gas purification apparatus 101 includes a body 100, an intake part 120, a filter 140, and a body cover 160.

For example, the exhaust gas purification apparatus 101 may be the same as the above-described exhaust gas purification apparatus 101 of the present disclosure.

When the engine room cover 50 is opened, at least a portion of the body cover 160 of the exhaust gas purification apparatus 101 is exposed.

Therefore, the worker may easily access the body cover 160 after opening the engine room cover 50. Afterwards, the operator may open the body cover 160 to remove and install the filter 140 from and into the body 100.

That is, the operator may easily replace the filter 140 using the above-described arrangement of the exhaust gas purification apparatus 101.

In addition, in the construction machinery 103 according to an embodiment of the present disclosure, a support ring 300 may be exposed when the engine room cover 50 is opened.

The support ring 300 may be installed on an upper outer peripheral surface of the body 100 of the exhaust gas purification apparatus 101 and may be exposed to the outside when the engine room cover 50 of the engine room 11 is opened. That is, at a time of installing the exhaust gas purification apparatus 101 in the engine room 11 or removing the exhaust gas purification apparatus 101 from the engine room 11, a chain or rope may be installed to hang on the support ring 300.

Hereinafter, construction machinery 104 according to another embodiment of the present disclosure will be described with reference to FIGS. 12 to 14 and FIGS. 16 and 17.

Figure 17:
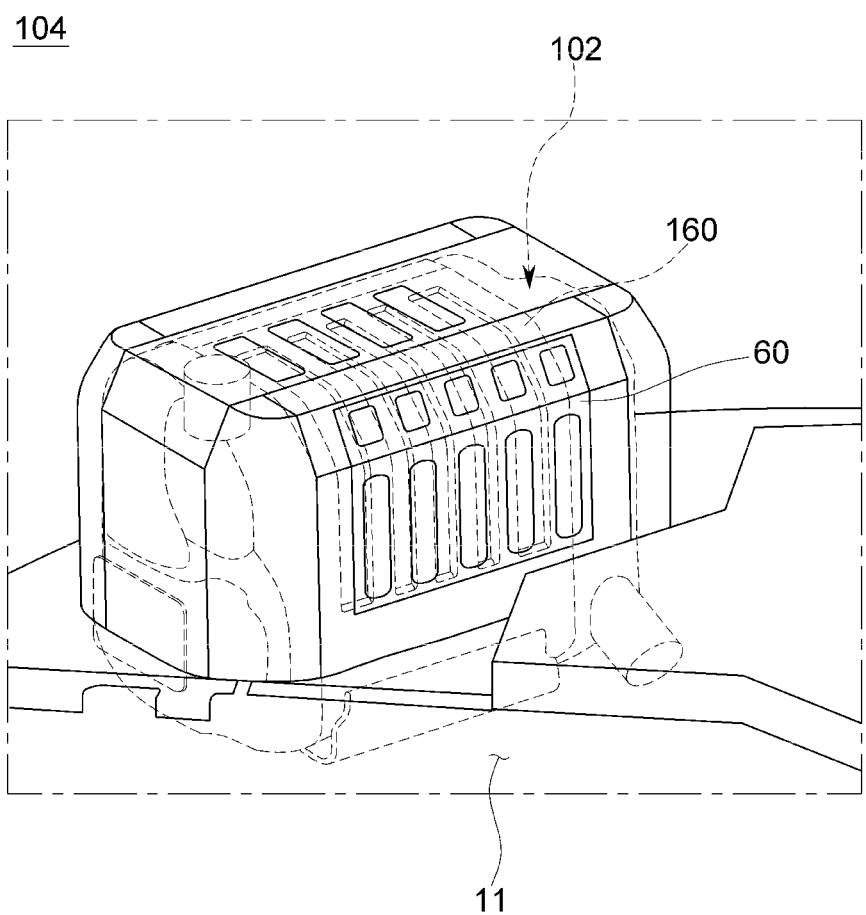
FIG. 17 is an enlarged view of an area where the exhaust gas purification apparatus of FIG. 16 is installed.

The construction machinery 104 according to another embodiment of the present disclosure includes an engine room 11, an exhaust gas purification apparatus 102, and a purification apparatus cover 60, as shown in FIGS. 16 and 17.

An engine 20 is installed inside the engine room 11. The engine 20 may combust fuel and generate power, which, in turn, can operate the motors or pumps necessary for driving the construction machinery 104.

In addition, the engine room 11 may be formed on a main frame 10 and have the engine 20 installed therein. A counterweight 30 of the construction machinery 104 may be placed adjacent to the engine room 11.

At least a portion of the exhaust gas purification apparatus 102 protrudes upward from the engine room 11. Specifically, the exhaust gas purification apparatus 102 may be arranged so that at least a portion of the exhaust gas purification apparatus 102 protrudes upward from one surface of the counter weight 30.

That is, at least a portion of the exhaust gas purification apparatus 102 may protrude upward from the engine room 11, while the remaining part of the exhaust gas purification apparatus 102 may be inserted and installed inside the engine room 11

The exhaust gas purification apparatus 102 includes a body 100, an intake part 120, a filter 140, and a body cover 160.

For example, the exhaust gas purification apparatus 102 may be the same as the above-described exhaust gas purification apparatus 102 of the present disclosure.

The purification apparatus cover 60 covers at least a portion of the exhaust gas purification apparatus 102. In addition, the purifier cover 60 may be arranged so that at least a portion of the body cover 160 is exposed when the purifier cover 60 is opened.

Specifically, the purifier cover 60 covers at least a portion of the exhaust gas purifier 102 protruding upward from the engine room 11. In addition, at least a portion of the purifier cover 60 may be formed to be openable. Also, when the openable purifier cover 60 is opened, at least a portion of the body cover 160 of the exhaust gas purifier 102 may be exposed.

Therefore, at a time of replacing the filter 140 of the exhaust gas purification apparatus 102, an operator may easily access the body cover 160 by opening the openable purifier cover 60.

With this configuration, it is possible to easily replace the filter 140 in the exhaust gas purification apparatus 101, 102 of the present disclosure. In addition, in the exhaust gas purification apparatus 101, 102, since the body 100 has a shape with at least two identical corners 115, 116, and 117, the orientation of the body 100 may be adjusted for convenient installation at a desired location.

In addition, the construction machinery 103, 104 of the present disclosure can be easily accessed by an operator to replace the filter 140 of the exhaust gas purification apparatus 101, 102 by opening the engine room cover 50.

In addition, the construction machinery 103, 104 of the present disclosure may be easily accessed by an operator to replace the filter 140 of the exhaust gas purification apparatus 101, 102 by opening the openable purifier cover 60.

The exemplary embodiments of the present disclosure have been described with reference to the accompanying drawings, but those skilled in the art will understand that the present disclosure may be implemented in other specific forms without changing the technical spirit or an essential feature thereof.

Accordingly, it will be understood that the aforementioned exemplary embodiments are described for illustration in all aspects and are not limited, and it will be construed that the scope of the present disclosure is represented by the claims to be described below, and all of the changes or modified forms induced from the meaning and the scope of the claims, and an equivalent concept thereof are included in the scope of the present disclosure.

DETAILED DESCRIPTION OF MAIN ELEMENTS

| | |
|---|---|
| 11: engine room | 20: engine |
| 50: engine room cover | 60: purifier cover |
| 101, 102: exhaust gas purification apparatus | 103, 104: construction machinery |
| 100: body | 110: opening area |
| 120: inlet part | 121: inlet |
| 122: guide area | 130: discharge part |
| 131: outlet | |
| 140: filter | 150: selective reduction catalyst |
| 160: body cover | 170: mixing member |
| 180: injection part | |
| 111: one surface | 113: 1st neighboring face |
| 112: the other surface | 114: second neighboring surface |
| 115: first corner | 117: second corner |
| 116: third corner | |
| 190: coolant tank | A: imaginary line |
| 200: bracket | 210: support arm |
| 220: fastening portion | 230: bent portion |
| 300: support ring | 400: electrical member |
| 410: differential pressure detection member | |
| W: width | H: height |

What is claimed is:

1. An exhaust gas purification apparatus for purifying exhaust gas emitted from an engine and discharges the exhaust gas to an outside, the apparatus comprising:
    a body formed with an opening area in which one area is opened;
    an intake part disposed on a first side of the body and having an inlet through which the exhaust gas is introduced;
    a body cover capable of covering the opening area;
    a filter disposed inside the body and capable of entry and exit through the opening area, wherein the filter is positioned with a portion of an outer peripheral surface facing an inner peripheral surface of the body cover;
    a selective reduction catalyst disposed inside the body to reduce nitrogen oxides contained in exhaust gas passing through the filter, having a first catalyst disposed in parallel to the filter in the body and disposed to be relatively closer to the inlet than the filter and a second catalyst disposed in parallel to the first catalyst in the body; and
    a discharge part disposed on a second side of the body and having an outlet through which exhaust gas which is branched after the pass filter and passes through the first catalyst and the second catalyst is discharged, wherein the outlet is disposed relatively higher on the body than the inlet,
    wherein the intake part further comprises:
        a guide area formed on one side of the body with an outwardly protruding portion, and elongated in one direction of the body so that the exhaust gas flowing from the inlet is directed to the filter.

2. The exhaust gas purification apparatus of claim 1, wherein the intake part and the discharge part are spaced apart from each other with the filter at a center.

3. The exhaust gas purification apparatus of claim 1, further comprising a sensor supported on one side of the body formed relatively recessed than the guide area and configured to detect information on exhaust gas passing through the filter or the selective reduction catalyst.

4. The exhaust gas purification apparatus of claim 1, further comprising a differential pressure sensor supported on the body so as not to interfere when the body cover is opened and configured to detect a differential pressure between exhaust gas flowing into a front of the filter and exhaust gas having passed through the filter.

5. The exhaust gas purification apparatus of claim 1, further comprising:
    an injection nozzle injecting a reducing agent into exhaust gas having passed through the filter, and supported on the other side of the body;

a guide pipe guiding exhaust gas passing through the filter to the selective reduction catalyst; and a mixer mixing the reducing agent injected from the injection part and the exhaust gas passing through the guide pipe.

6. The exhaust gas purification apparatus of claim 5, further comprising a coolant tank supported on the body above the injection nozzle and containing coolant to be supplied to the injection nozzle.

7. The exhaust gas purification apparatus of claim 1, wherein in the opening area, a portion of one surface of the body and a portion of a first neighboring surface adjacent to the one surface are formed to communicate with each other.

8. The exhaust gas purification apparatus of claim 7, wherein the filter is disposed between the one surface and the first neighboring surface.

9. The exhaust gas purification apparatus of claim 5, wherein the filter is disposed closer to an upper part of the body than the mixer.

10. The exhaust gas purification apparatus of claim 7, wherein the body has a corner between the first neighboring surface and the other surface opposing the one surface, and a corner of a second neighboring surface between the other surface and the one surface.

11. The exhaust gas purification apparatus of claim 10, further comprising a bracket installed on one or more of the corners, wherein the bracket comprises:

a support arm for contacting and supporting a portion of the installed corners;

a fastening portion for securing the body at an installation location; and a bent portion disposed to face a corresponding one of the corners.

12. The exhaust gas purification apparatus of claim 11, wherein the bent portion is disposed on an inner side of an imaginary line, which contacts a neighboring surface connected to a corner, where the bracket is installed, in a direction parallel to a height direction of the body.

13. The exhaust gas purification apparatus of claim 1, wherein the inlet is positioned away from one end of the filter, through which the exhaust gas flows, in a direction intersecting a longitudinal direction of the filter.

14. Construction machinery comprising:

an engine room where an engine is installed;

an engine room cover covering the engine room and capable of being opened and closed; and an exhaust gas purification apparatus, wherein the exhaust gas purification apparatus comprises: a body formed with an opening area in which one area is opened, an intake part disposed on a first side of the body and having an inlet through which the exhaust gas is introduced, a body cover capable of covering the opening area, a filter disposed inside the body and capable of entry and exit through the opening area, wherein the filter is positioned with a portion of an outer peripheral surface facing an inner peripheral surface of the body cover, a selective reduction catalyst disposed inside the body to reduce nitrogen oxides contained in exhaust gas passing through the filter, having a first catalyst disposed in parallel to the filter in the body and disposed to be relatively closer to the inlet than the filter and a second catalyst disposed in parallel to the first catalyst in the body, and a discharge part disposed on a second side of the body and having an outlet through which exhaust gas which is branched after the pass filter and passes through the first catalyst and the second catalyst is discharged, wherein the outlet is disposed relatively higher on the body than the inlet, wherein the intake part further comprises a guide area formed on one side of the body with an outwardly protruding portion, and elongated in one direction of the body so that the exhaust gas flowing from the inlet is directed to the filter, and wherein at least a portion of the body cover is exposed when the engine room cover is opened.

15. The construction machinery of claim 14, wherein the exhaust gas purification apparatus further comprises a support ring installed on an outer peripheral surface of the body and exposed when the engine room cover is opened.

16. Construction machinery comprising:

an engine room where an engine is installed;

an exhaust gas purification apparatus having at least a portion protruding upward from an engine room, wherein the exhaust gas purification apparatus comprises: a body formed with an opening area in which one area is opened, an intake part disposed on a first side of the body and having an inlet through which exhaust gas is introduced, a body cover capable of covering the opening area, a filter disposed inside the body and capable of entry and exit through the opening area, wherein the filter is positioned with a portion of an outer peripheral surface facing an inner peripheral surface of the body cover, a selective reduction catalyst disposed inside the body to reduce nitrogen oxides contained in exhaust gas passing through the filter, having a first catalyst disposed in parallel to the filter in the body and disposed to be relatively closer to the inlet than the filter and a second catalyst disposed in parallel to the first catalyst in the body, and a discharge part disposed on a second side of the body and having an outlet through which exhaust gas which is branched after the pass filter and passes through the first catalyst and the second catalyst is discharged, wherein the outlet is disposed relatively higher on the body than the inlet, and wherein the intake part further comprises a guide area formed on one side of the body with an outwardly protruding portion, and elongated in one direction of the body so that the exhaust gas flowing from the inlet is directed to the filter; and a purification apparatus cover covering at least a portion of the exhaust gas purification apparatus and, when opened, exposing at least a portion of the body cover.

* * * * *